July 28, 1925
Re. 16,128
H. F. SNYDER
WASHING MACHINE
Original Filed July 19, 1915
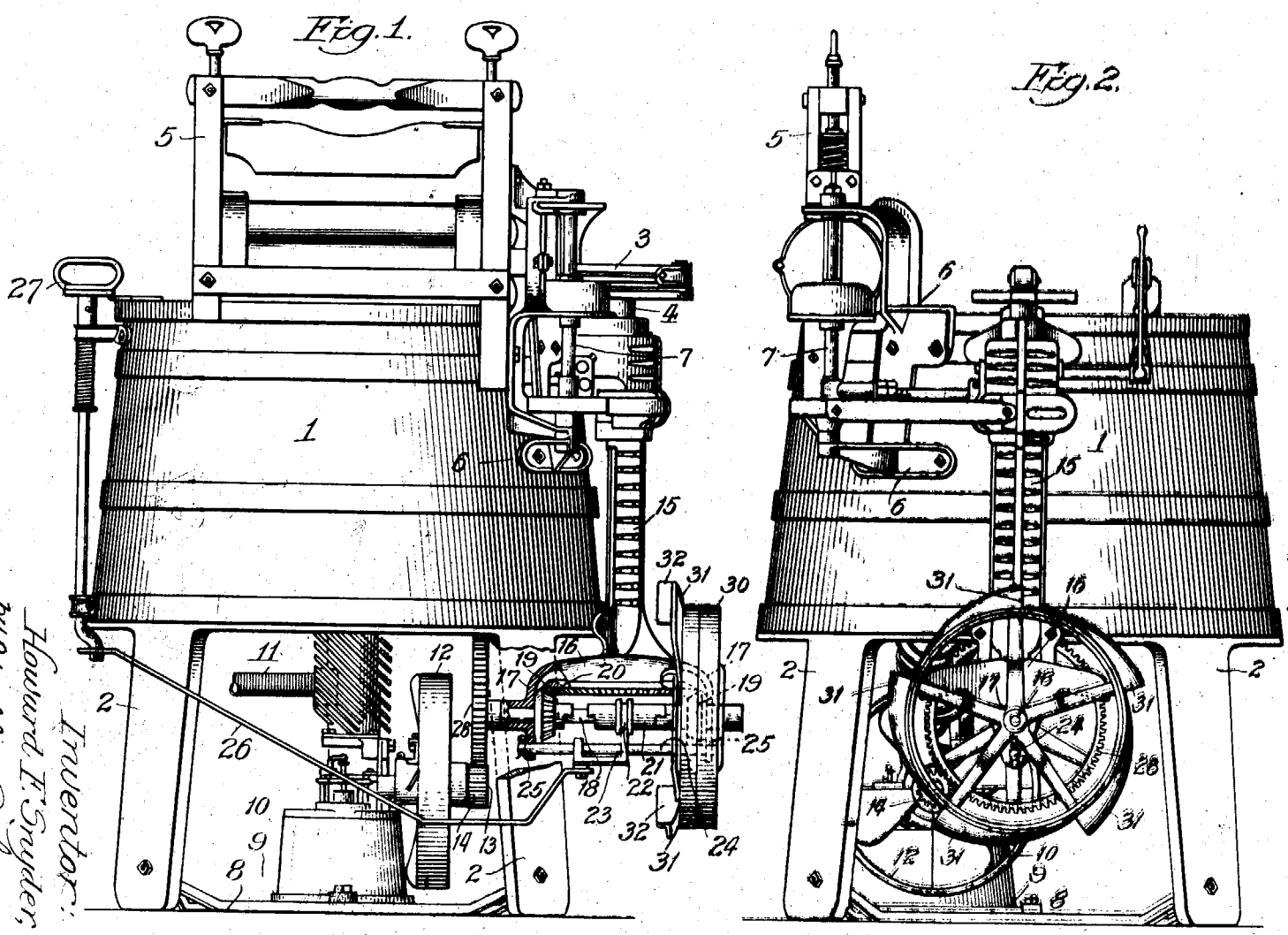
Inventor:
Howard F. Snyder,
by Wallace R. Lane
Atty.

Reissued July 28, 1925.

Re. 16,128

UNITED STATES PATENT OFFICE.

HOWARD F. SNYDER, OF NEWTON, IOWA, ASSIGNOR TO THE MAYTAG COMPANY, OF NEWTON, IOWA, A CORPORATION OF IOWA.

WASHING MACHINE.

Original No. 1,381,940, dated June 21, 1921, Serial No. 40,561, filed July 19, 1915. Application for reissue filed November 9, 1922. Serial No. 599,947.

*To all whom it may concern:*

Be it known that I, HOWARD F. SNYDER, a citizen of the United States, residing at Newton, in the county of Jasper and State of Iowa, have invented certain new and useful Improvements in Washing Machines, of which the following is the specification.

This invention relates to washing machines, and particularly to means for combining into a washing machine all of the elements of a power plant so as to make it possible to operate the machine as a single power unit and to make it unnecessary to bring the power element to the washer, or the washer to the power element.

Power washing machines of the prior art, in so far as I am aware except those driven by a motor necessitating either electricity or water power, both inaccessible to the ordinary farmer, are always provided with a belt drive for operating the washing and wringer mechanisms and are driven by an internal combustion engine, generally from an engine which is in use upon the farm or in the house for some other purpose. This makes it necessary to take the washing machine to the engine, or bring the engine to the washing machine every time a washing is to be done, which involves heavy lifting and other arduous work for which women are unsuitable.

It is an object of my invention to provide an assembled machine and power plant so constructed and arranged as to be compact, simple and economical, to avoid the necessity of bringing together power plant and machine whenever washing is to be done, and to otherwise facilitate and render simple the washing operation.

It is another object of my invention to provide an internal combustion engine as a part of and in connection with a washing machine, and to provide a direct drive from the internal combustion engine to the washing machine whereby the use of belts, which are always unsatisfactory and dangerous, is avoided.

It is a still further object of my invention to provide a simple and efficient starting device whereby the washing machine forming the subject-matter of my invention may be instantly started into operation by a mere pedal operation.

Other objects and advantages of the invention will appear as the description to follow proceeds.

In the drawings:

Fig. 1 is an elevation of a washing machine constructed according to my invention, with parts in section and parts broken away.

Fig. 2 is a side elevation of the same machine.

In the drawings: 1 represents a washing machine tub of usual construction provided with legs 2 and supplied with a dolly operated by the crank 3 from the vertical shaft 4, hereinafter referred to, and with a swinging wringer 5 pivotally mounted upon the bracket 6 and operated, preferably, by a chain drive from the shaft 4, which operates the vertical shaft 7 of the swinging wringer, by which the horizontal gear driving the lower wringer shaft is revolved.

The precise details of the construction so far described form no part in themselves of the invention herein claimed, but are illustrated and described in my Patent No. 1,117,268.

Mounted upon the legs 2 and depending therefrom so as to be supported also by the floor, is a platform 8 upon which is firmly bolted the bed plate 9 and casing 10 of an internal combustion engine, though any engine delivering the required power could be used. 11 represents a flexible exhaust tube for guiding away the exhaust from said engine to a point where it can safely be discharged. The engine is provided with a fly-wheel 12 upon the shaft 13, which shaft is also provided with a small pinion 14, hereinafter to be referred to. Firmly mounted upon the side of the tub is the long casing 15 having therein bearings for the vertical shaft 4. The casing 15 is at its lower end expanded into a bell 16 which has elongate i depending brackets 17 in which is mounted the main operating shaft 18 of the washing machine. Loosely mounted upon the shaft 18 are beveled pinions 19 both in mesh with the large beveled gear 20 rigidly mounted upon the shaft 4. Interposed between the beveled gears 19 and co-operating with them is a clutch 21 splined to the shaft 18 and provided with a peripheral groove 22 for the accommodation of the fork 23 which is slidably mounted upon the rod 24, supported by ears 25 depending from the bell 16. The fork 23 is operated by the bent link 26 controlled by the handle 27, to throw the clutch 21 into neutral position or into position to engage and drive either of the pinions 19 and thus drive the shaft 4 in either direction to operate the washing mechanism and reversible wringer. The shaft 18 is driven by a large gear 28 mounted upon the inner end thereof and in mesh with the pinion 14, hereinabove described. It will be noted that the gear 28 is considerably larger than the pinion 14.

I will now describe the starting device: Upon the outer end of the shaft 18 is a belt wheel 30 by which power can be communicated from the washing machine to other mechanisms, for instance a mangle, if desired, by means of a belt. The belt wheel 30 is provided with a series, in this instance five, of radial projections 31 each of which carries a pedal 32. It will be obvious that the operator can at any position of the engine press down with her foot upon a convenient pedal 32 which will revolve the shaft 18, and by reason of the large gear ratio 28–14 spin the engine and cause the same to start. It is obvious that the starting pedals 32 do not have to be applied to a belt wheel, this modification being here illustrated simply as presenting a convenient combination, of the starting devices with a means to drive other machinery than the washing machine. The starting devices, obviously, would serve their purpose equally well if the belt wheel were omitted and they were applied upon radial spokes attached to the shaft 18, or otherwise. I consider this an important feature of the invention and broadly new.

Having now described my invention, I claim:

1. In a washing machine, the combination of a mobile standard, a driven shaft mounted thereon, an internal combustion engine having a driving shaft and rigidly mounted on said standard whereby to be transported with and to provide said machine with a constantly present and available source of power for said driven shaft irrespective of the location of said machine, a speed reduction transmission disposed between said drive and driven shafts for operating the driven shaft at a slower speed than the engine shaft, said transmission including a shaft having a pulley thereon adapted to be rotated for starting, means to break the driving connection of said speed reduction transmission between said drive and driven shafts to throw out the driven shaft when desired, said speed reduction transmission and said pulley being arranged so that when the engine shaft is rotated by said pulley for starting, said speed reduction transmission forms a speed multiplying transmission for facilitating the starting of said engine.

2. In a washing machine, the combination of a standard, a driven shaft operatively mounted on said standard, said standard being portable whereby said machine may be moved from place to place to be used where desired, an internal combustion engine having a driving shaft and rigidly mounted on said standard whereby to be transported with and to provide said machine with a constantly present and available source of power for said driven shaft irrespective of the location of said machine, a speed reduction transmission connection interposed between said driving shaft and said driven shaft and including a third shaft, a relatively large belt pulley rigidly mounted upon said third shaft, said pulley having means for permitting the rotation of the pulley whereby when the engine shaft is to be rotated by said pulley for starting, said speed reduction transmission forms a speed multiplying transmission for facilitating the starting of the engine.

3. In a washing machine, the combination of a standard, a reversible shaft mounted on said standard, a driven shaft operatively mounted on said standard, said standard being portable whereby said machine may be moved from place to place to be used where desired, an internal combustion engine having a driving shaft and rigidly mounted on said standard whereby to be transported with and to provide said machine with a constantly present and available source of power for said driven shaft and reversible shaft irrespective of the location of said machine, a gear adapted to be reversibly driven, actuating connections from said gear to said driven shaft and from said gear to said reversible shaft whereby to actuate said driven shaft irrespective of the direction of operation of the reversible shaft, and a reduction gearing connection from said gas engine shaft to said gear to actuate the latter, said connection including a clutch operable to drive said gear in either direction or to disconnect said gear from driving relation with the engine shaft.

4. In a washing machine, the combination of a standard, a driven shaft operatively mounted on said standard, a reversible shaft mounted on said standard and adapted to be reversibly driven, said standard being portable whereby said machine may be moved from place to place to be used where desired, an internal combustion engine mounted rigidly on said standard, a main driving shaft mounted on said standard, a relatively large gear on the end of said main shaft adjacent the engine, a small gear on the engine shaft meshing with said relatively large gear, a bracket mounted on said standard, a vertical shaft carried by said bracket, a driving connection between said vertical shaft and said driven shaft and reversible shaft respectively, a bevel gear connected to said vertical shaft, two bevel gears loosely mounted on said main driving shaft and meshing with opposite sides of said bevel gear, a clutch splined on said main driving shaft intermediate said spaced bevel gears and means to shift said clutch to connect either of said spaced bevel gears with the bevel gear on said vertical shaft, and a starting wheel rigidly fixed on the end of said main driving shaft.

5. In a washing machine, the combination of a standard, a driven shaft operatively mounted thereon, an internal combustion engine rigidly mounted on said standard and provided with a driving shaft, a second shaft on said standard, means for driving said second shaft from said engine shaft at a reduced speed, driving connections from said second shaft to said driven shaft whereby said driven shaft is operated at a reduced speed, means for disconnecting said driving connections to said driven shaft, and a starting mechanism for said second shaft including a pulley rigid therewith.

6. In a washing machine, the combination of a standard, a driven shaft operatively mounted thereon, an internal combustion engine rigidly mounted on said standard and provided with a driving shaft, a second shaft on said standard, means for driving said second shaft from said engine shaft at a reduced speed, driving connection from said second shaft to said driven shaft to drive the driven shaft at a reduced speed, means for disconnecting said driving connection to said driven shaft, and a starting wheel of relatively large diameter rigid on said second shaft whereby to provide a multiplying gearing to turn said engine shaft from said starting wheel.

HOWARD F. SNYDER.